US011675791B2

United States Patent
Marshall et al.

(10) Patent No.: US 11,675,791 B2
(45) Date of Patent: Jun. 13, 2023

(54) SYSTEM AND METHOD FOR TRACKING PROGRESSION TOWARD A CUSTOMIZED GOAL

(71) Applicant: Data Health Partners, Inc., Beverly Hills, CA (US)

(72) Inventors: Lisa A. Marshall, Richmond, VA (US); James Gaynor, Winchester, VA (US)

(73) Assignee: DATA HEALTH PARTNERS, INC., Beverly Hills, CA (US)

(*) Notice: Subject to any disclaimer, the term of this patent is extended or adjusted under 35 U.S.C. 154(b) by 0 days.

(21) Appl. No.: 17/505,166

(22) Filed: Oct. 19, 2021

(65) Prior Publication Data

US 2022/0035805 A1 Feb. 3, 2022

Related U.S. Application Data

(63) Continuation of application No. 16/053,141, filed on Aug. 2, 2018, now Pat. No. 11,151,142, which is a
(Continued)

(51) Int. Cl.
*G06F 16/2457* (2019.01)
*G06Q 10/0637* (2023.01)
*G06Q 10/06* (2023.01)

(52) U.S. Cl.
CPC ..... *G06F 16/2457* (2019.01); *G06Q 10/0637* (2013.01); *G06Q 10/06* (2013.01)

(58) Field of Classification Search
None
See application file for complete search history.

(56) References Cited

U.S. PATENT DOCUMENTS

| 4,237,344 A | * | 12/1980 | Moore | H04M 11/027 |
| | | | | 379/38 |
| 5,377,258 A | * | 12/1994 | Bro | G16H 70/60 |
| | | | | 379/106.02 |

(Continued)

OTHER PUBLICATIONS

"International Application No. PCT/US2014/029287 International Search Report and Written Opinion", dated Aug. 22, 2014, 7 pages.

*Primary Examiner* — Christopher J Raab
(74) *Attorney, Agent, or Firm* — Goodhue, Coleman & Owens, P.C.

(57) ABSTRACT

A system, method, server, and computer readable medium for tracking progression toward a customized goal. Input establishing accounts for clients is received. Each of the clients is assigned to one or more of the providers in response to selections from an administrator. Customized goals are established for each of the clients based on treatment or assistance required. Data associated with each of the clients is received from the one or more providers. Data associated with each of the clients received from the providers is compiled. A determination is made whether the customized goals are being met in response one or more thresholds for the compiled data. Alerts are automatically communicated to at least the one or more providers in response to the compiled data varying from the one or more thresholds to become significant for one or more of the clients.

20 Claims, 12 Drawing Sheets

Related U.S. Application Data continuation of application No. 14/212,429, filed on Mar. 14, 2014, now Pat. No. 10,061,812.

(60) Provisional application No. 61/791,218, filed on Mar. 15, 2013.

(56) References Cited

U.S. PATENT DOCUMENTS

| | | |
|---|---|---|
| RE42,508 E | 6/2011 | Lewis et al. |
| 8,066,640 B2 | 11/2011 | Angelides |
| 8,313,433 B2 | 11/2012 | Cohen et al. |
| 8,355,925 B2 | 1/2013 | Rothman et al. |
| 2002/0065697 A1 | 5/2002 | Cautley et al. |
| 2002/0147626 A1 | 10/2002 | Zagotta et al. |
| 2002/0194046 A1 | 12/2002 | Sullivan et al. |
| 2003/0004758 A1* | 1/2003 | Luttrell .................. G06Q 10/10 705/3 |
| 2003/0014279 A1 | 1/2003 | Roman et al. |
| 2008/0141138 A1 | 6/2008 | Kalaboukis et al. |
| 2008/0270182 A1 | 10/2008 | Lowney |
| 2008/0281651 A1 | 11/2008 | Brennan et al. |
| 2009/0048872 A1* | 2/2009 | Toy ........................ G16H 20/70 705/3 |
| 2009/0112924 A1 | 4/2009 | Harris et al. |
| 2009/0192825 A1 | 7/2009 | Hunt et al. |
| 2010/0082381 A1 | 4/2010 | Merrifield, Jr. et al. |
| 2011/0029521 A1 | 2/2011 | Thayne et al. |
| 2011/0047404 A1 | 2/2011 | Metzler et al. |
| 2011/0161107 A1 | 6/2011 | Goldberg et al. |
| 2011/0295613 A1* | 12/2011 | Coyne .................... G06Q 10/10 705/2 |

* cited by examiner

| Task | | | Level of Prompt Needed | | | |
|---|---|---|---|---|---|---|
| Walk into bathroom | Refused 0 | Hand-over-hand 1 | Touch 2 | Gestural 3 | Verbal 4 | Independent 5 |
| Pick up toothbrush | Refused 0 | Hand-over-hand 1 | Touch 2 | Gestural 3 | Verbal 4 | Independent 5 |
| Put toothpaste on brush | Refused 0 | Hand-over-hand 1 | Touch 2 | Gestural 3 | Verbal 4 | Independent 5 |
| Brush teeth for 30 seconds | Refused 0 | Hand-over-hand 1 | Touch 2 | Gestural 3 | Verbal 4 | Independent 5 |
| Return brush and paste | Refused 0 | Hand-over-hand 1 | Touch 2 | Gestural 3 | Verbal 4 | Independent 5 |
| Rinse mouth | Refused 0 | Hand-over-hand 1 | Touch 2 | Gestural 3 | Verbal 4 | Independent 5 |
| Dry hands | Refused | Hand-over-hand 1 | Touch 2 | Gestural 3 | Verbal 4 | Independent 5 |

| Highest Possible | Obtained | Percentage |
|---|---|---|
| 35 | 18 | 51 |

Task Analysis a. What level/percent do you want (subject) to get? _____% b. Across how many opportunities? _____ within _____ interval c. Is there a time limit? Yes  No

- If yes, what is the time limit? _____ (interval)

d. How would you like your data calculated and graphed?  Average or for each episode.

e. For how long do you want (subject) to get a score of _____ (prepopulated based on answer to a) in order to consider this goal/objective mastered? _____ out of _____ (interval) or _____ consecutive (interval)

f. Projected closure data for goal/objective (timeline to master)

g. Y axis label h. Baseline mode – on or off i. Tasks – number of tasks and labels for each task j. Prompt hierarchy – level of prompt, score and color-coding k. Option to add to goal bank l. Instructions/Directions m. Special permissions related to data collection n. Alert recipients o. Customized modification to data analysis rules if applicable

FIG. 8

Intensive Trial Teaching a. What percentage should be achieved? _____
b. How many trials? #_____ Randomize trial listing? Yes No
c. Across how many episodes? _____ within _____ (interval)
d. How would you like your data calculated and graphed? Average or for each episode.
e. For how long do you want (subject) to get a score of _____ (prepopulated based on answer to a) in order to consider this goal/objective mastered? _____ out of _____ (interval) or _____ consecutive (interval)
f. Projected closure data for goal/objective (timeline to master)
g. Y axis label
h. Baseline mode – on or off
i. Trials – number of tasks and labels for each task
j. Label to identify correctness: Right/Wrong, Correct/Incorrect, Yes/No
k. Option to add to goal bank
l. Instructions/Directions
m. Special permissions related to data collection
n. Alert recipients
o. Customized modification to data analysis rules if applicable

FIG. 9

Interval Recording a. What percent of intervals are you trying to achieve? _____# b. What type of time sampling should be used? Whole, Partial, Momentary c. Observation duration: _____ min _____ sec d. Interval duration: _____ min _____ sec e. Across how many opportunities? _____ within _____ (interval)

f. How would you like your data calculated and graphed? Average or for each episode g. For how long do you want (subject) to maintain the score in order to consider this goal/objective mastered? _____ out of _____ (interval) or _____ consecutive (interval)

h. Projected closure data for goal/objective (timeline to master)

i. Y axis label j. Baseline mode – on or off k. Label to identify correctness: Right/Wrong, Correct/Incorrect, Yes/No l. Option to add to goal bank m. Instructions/Directions n. Special permissions related to data collection o. Alert recipients p. Customized modification to data analysis rules if applicable

FIG. 10

Duration Recording a. What is your desired duration? _____ # (interval)
b. How many episodes do you want to measure? All or ____ per ____ (interval)
c. How would you like your data calculated and graphed? Cumulative or Average or for Each episode
d. For how long do you want (subject) to maintain (pre-populated duration) in order to consider this goal/objective mastered? _____ out of ____ (interval) or ____ consecutive (interval)
e. Projected closure data for goal/objective (timeline to master)
f. Y axis label
g. Baseline mode – on or off
h. Option to add to goal bank
i. Instructions/Directions
j. Special permissions related to data collection
k. Alert recipients
l. Customized modification to data analysis rules if applicable

FIG. 11

Frequency Recording a. Do you want to collect data all day   Yes   No
If not, Data Collection from _____ time to _____ time
b. What is the desire score? _____ #
c. Choose collection limit:   Exactly   At Least
d. Across how many opportunities? _____ out of _____ (interval)
e. How would you like your data calculated and graphed?   Cumulative or Average
f. For how long do you want (subject) to maintain the score in order to consider this goal/ objective mastered? _____ out of _____ (interval) or _____ consecutive (interval)
g. Projected closure data for goal/objective (timeline to master)
h. Y axis label
i. Baseline mode – on or off
j. Option to add to goal bank
k. Instructions/Directions
l. Special permissions related to data collection
m. Alert recipients
n. Customized modification to data analysis rules if applicable

FIG. 12

Percentage Recording a. What level/percent do you want? _____ # b. Across how many opportunities? All or _____ within _____ (interval)

c. Is there a time limit per opportunity? Yes No

If yes, What is the time limit? _____ # (interval)

d. How would you like your data calculated and graphed? Average or Each episode e. For how long do you want (subject) to maintain the score in order to consider the goal/ objective mastered? _____ out of _____ (interval) or _____ consecutive (interval)

f. Projected closure data for goal/objective (timeline to master)

g. Y axis label h. Highest Possible Score i. Baseline mode – on or off j. Option to add to goal bank k. Instructions/Directions l. Special permissions related to data collection m. Alert recipients n. Customized modification to data analysis rules if applicable

SYSTEM AND METHOD FOR TRACKING PROGRESSION TOWARD A CUSTOMIZED GOAL

RELATED APPLICATIONS

This application is a continuation of U.S. application Ser. No. 16/053,141 filed on Aug. 2, 2018 which is a continuation of U.S. Pat. No. 10,061,812 filed on Mar. 14, 2014 which claims the priority benefit of U.S. Application Ser. No. 61/791,218 filed Mar. 15, 2013.

BACKGROUND

The ability of organizations, hospitals, schools, businesses, individuals, and others to meet goals is, and always will be, a significant challenge. In particular, it is important to recognize and treat problems and issues that prevent goals and other objectives from being achieved. For example, organizations and institutions that help individuals with disabilities and significant emotional or behavioral challenges have improved their processes in recent years. In particular, more individuals with physical disabilities, autism, chemical imbalances, mental disorders, behavioral problems, drug addictions, and other conditions are being served each year. Improved assessment, medications, training, treatment processes, and education, have provided solutions for addressing the concerns of individuals with special needs.

However, electronic systems, equipment, software, and processes for tracking, treating, and recording results, such as for individuals with special needs, have not improved as significantly. For example, some organizations still use paper documents and charts to track individuals' information or a single computing system available from only one location to enter and review data. As a result, viewing, updating, managing, and sharing, relevant information may be more difficult than it should be.

SUMMARY

Illustrative embodiments provide a system, method, server, and computer readable medium for tracking progression toward a customized goal. Input establishing accounts for clients is received. The clients are individuals receiving treatment or assistance. The accounts are stored in a server available through one or more networks. Each of the clients is assigned to one or more of the providers in response to selections from an administrator. The one or more providers include at least a communications device. Customized goals are established for each of the clients based on treatment or assistance required. Data associated with each of the clients is received from the one or more providers. Data associated with each of the clients received from the providers is compiled. A determination is made whether the customized goals are being met in response one or more thresholds for the compiled data. Alerts are automatically communicated to at least the one or more providers in response to the compiled data varying from the one or more thresholds to become significant for one or more of the clients. The illustrative embodiments also provide a system or platform including a processor for executing a set of instructions and a memory for storing the set of instructions. The set of instructions or other non-transitory memory are executed to perform the methods herein described.

Another embodiment provides a system for tracking progression toward a customized goal. The system includes a server that communicates with a communications device through a transceiver utilizing one or more networks. The server includes a processor that executes a client management program to receive input establishing an account for a client, wherein the client is an individual receiving treatment or assistance, and wherein the accounts are stored in a server available through the one or more networks, assign the client to one or more of providers in response to selections from an administrator, wherein the one or more providers include at least one of the communications devices, establish customized goals for the client based on treatment or assistance required, receive data associated with the client from the one or more providers, compile the data associated with the client received from the communications devices in communication with the server, determine whether the customized goals are being met in response to one or more thresholds for the compiled data, and automatically communicate alerts in response to the compiled data varying from the one or more thresholds to become significant for one or more of the clients. The system includes a database in communication with the server configured to store the data compiled data, and thresholds associated with the client and the one or more providers.

The embodiments may include a number of different variations, alternatives, examples, and other implementations of the embodiments as described and shown. The one or more providers may further include individuals available to treat or assist the clients. The method may further include intervening in response to communicating the alerts to at least the one or more providers or caregivers associated with the one or more of the clients. The one or more providers may physically intervene to treat or assist the one or more of the clients. The customized goals, data, compiled data, thresholds, and alerts may be saved in the server. The one or more providers may include biometric sensors worn by or proximate to the clients. The compiled data may indicate the behavior of the clients. The one or more thresholds may include a range. The thresholds may include an upper range and a lower range. The thresholds may be customized for each of the clients. The server may be accessed through a cloud network. The client management program may be executed by communications devices utilized by the one or more providers to input the data. The customized goals are established in response to input from each of the clients and the one or more providers associated with each of the clients. The compiled data may be data mined to determine best practices. The best practices may be recommended in response to the best practices being associated with one of the clients. The customized goals, data, compiled data, thresholds, and alerts may be saved in the accounts associated with each of the clients. The accounts may be stored in a database associate with the server. The thresholds may be a customized range established for the clients. The database may be a relational database management system that performs data mining to analyze the data received from the one or more providers to automatically associate best practices with the client. The best practices may be recommended in response to historic success with one or more of the clients. The compiled data may indicate the behavior of the client.

Illustrative embodiments provide a system, method, server, controller, and computer readable medium for tracking goal progression. Input establishing accounts for providers serving clients is received. Each of the clients is assigned to one or more of the providers in response to selections from an administrator. Goals are established for each of the clients in response to treatments and assistance required. Data associated with each of the clients received from the providers is compiled. A determination is made whether the goals are being met in response to rules based on the compiled data. Alerts are automatically communicated in response to the compiled data varying from a threshold to become significant for one or more of the clients. The illustrative embodiments also provide a computer, server, or controller including a processor and memory for performing the processes herein described and a computer readable medium including a non-transitory memory for tracking outcome specific data.

Another illustrative embodiment provides a system, method, server, controller, and computer readable medium for tracking outcome specific data. Input establishing accounts for providers serving clients is received. The accounts are stored in a server. Each of the clients is assigned to one or more of the providers in response to selections from an administrator. Data associated with each of the clients received from the providers is compiled utilizing computing or communications devices in communication with the server. The compiled data is presented visually, in graph form, in response to a user request. The illustrative embodiments also provide a computer or server including a processor and memory for performing the process herein described and a computer readable medium including a non-transitory memory for tracking outcome specific data.

Another embodiment provides a system for tracking goal achievement of individuals. The system may include computing and communications devices in communication with a server through one or more networks. The server may be configured to receive input establishing accounts for a plurality of providers serving the individuals, assign each of the individuals to one or more of the providers in response to selections from an administrator, compile data associated with each of the individuals received from the providers utilizing the computing or communications devices in communication with the server, and present the compiled data visually in graph form in response to a user request. The system may also include a database in communication with the server configured to store the accounts, permissions, settings, and data.

In some embodiments, a method for tracking outcome specific data, the method comprises receiving input establishing accounts for providers serving clients, wherein the accounts are stored in a server; assigning each of the clients to one or more of the providers in response to selections from an administrator; compiling data associated with each of the clients received from the providers utilizing computing or communications devices in communication with the server; and presenting the compiled data visually in response to a user request.

In some embodiments, the server is accessed through a cloud network, and wherein an application executed by the computing or communications devices is utilized to receive user input from the providers.

In some embodiments, the method further comprises: establishing goals for the clients, wherein the data indicates a status of the goals.

In some embodiments, the method further comprises: data mining the data to determine best practices.

In some embodiments, the method further comprises: recommending the best practices to the providers in response to the best practices being associated with a client assigned to the providers.

In some embodiments, the data includes at least intervention plans, goals and objectives, recorded activities, and general notes.

In some embodiments, the method further comprises: communicating an alert in response to the data for each of the clients reaching a threshold associated with the alert.

In some embodiments, the method further comprises: receiving the data through a plurality of collection methods including task analysis, intensive trial teaching, interval recording, time recording, frequency, percentage data, and a reinforcement recorder.

In some embodiments, the method further comprises: tracking a time and occurrence number of client actions in response to input from the providers; and indicating a status of goals for the clients in response to the data.

In some embodiments, the method further comprises: reporting outcomes in response to data compared against a minimum growth line.

In some embodiments, a system for tracking goal achievement of individuals, the system comprising: computing and communications devices in communication with a server through one or more networks, the server configured to receive input establishing accounts for a plurality of providers serving the individuals, assign each of the individuals to one or more of the providers in response to selections from an administrator, compile data associated with each of the individuals received from the providers utilizing the computing or communications devices in communication with the server, and present the compiled data visualizing in response to a user request, and a database in communication with the server, the database configured to store the accounts, permissions, settings, and data.

In some embodiments, the database is a relational database management system performing data mining to analyze the data from the providers to associate best practices with each of the individuals.

In some embodiments, the server is configured to recommend one or more best practices to the plurality of providers in response to the data of the individuals being associated with the best practices.

In some embodiments, the one or more networks are a cloud network.

In some embodiments, the computing and communications devices are utilized by users to receive the data through a plurality of collection methods including task analysis, intensive trial teaching, interval recording, duration recording, frequency, recording, and percentage recording.

In some embodiments, a controller comprises a processor for executing a set of instructions; and a memory for storing the set of instructions, wherein the set of instructions are executed by the processor to receive input establishing user accounts for providers serving clients; assign each of the clients to one or more of the providers in response to selections from an administrator; compile data associated with each of the clients received from the providers utilizing computing or communications devices in communication with the server; and present the compiled data visually in response to a user request.

In some embodiments, the data includes at least intervention plans, goals and objectives, recorded activities, and general notes.

In some embodiments, the set of instructions are further executed to recommend best practices to the providers in response to historic success with the clients.

In some embodiments, the set of instructions are further executed to receive the data through a plurality of collection methods includes task analysis, intensive trial teaching, interval recording, time recording, frequency, percentage data, and a reinforcement recorder.

In some embodiments, the controller is accessible by a plurality of mobile devices, a plurality of computing devices, and a web interface.

BRIEF DESCRIPTION OF THE DRAWINGS

Illustrative embodiments of the present invention are described in detail below with reference to the attached drawing figures, which are incorporated by reference herein and wherein:

FIG. 4 provides a chart illustrating data collection in accordance with an illustrative embodiment;

FIG. 7 is a pictorial representation of task analysis in accordance with an illustrative embodiment;

FIG. 8 is a pictorial representation of intensive trial teaching questionnaire in accordance with an illustrative embodiment;

FIG. 9 is a pictorial representation of an interval recording questionnaire in accordance with an illustrative embodiment;

FIG. 10 is a pictorial representation of a duration recording questionnaire in accordance with an illustrative embodiment;

FIG. 11 is a pictorial representation of a frequency recording questionnaire in accordance with an illustrative embodiment; and FIG. 12 is a pictorial representation of a percentage recording questionnaire in accordance with an illustrative embodiment.

DETAILED DESCRIPTION OF THE DRAWINGS

Figure 1:
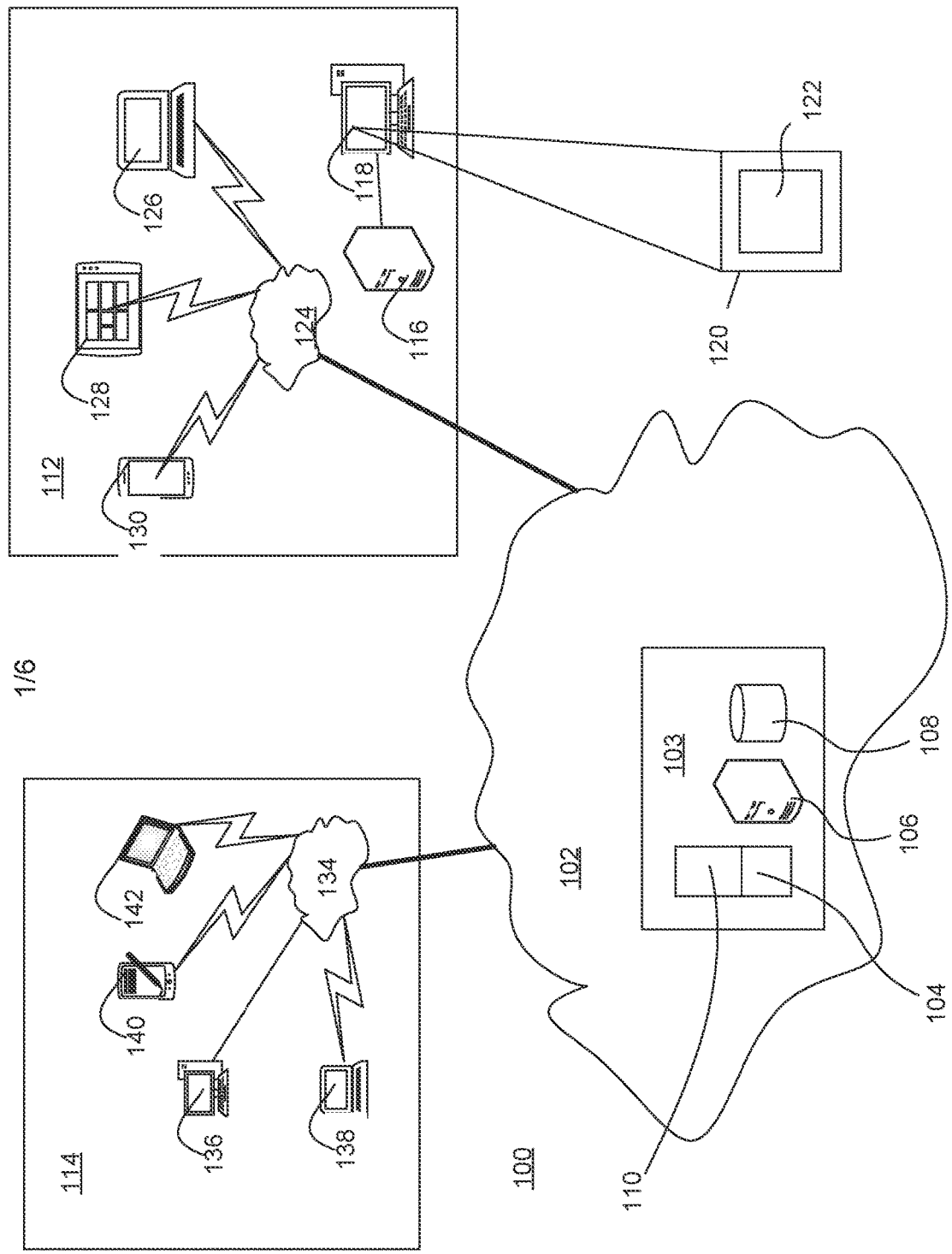
FIG. 1 is a pictorial representation of a health system in accordance with an illustrative embodiment.

The illustrative embodiments provide systems, methods, servers, techniques, platforms, instruction sequences, computer program products, and networks for optimizing, managing, and tracking data driven outcomes. In one embodiment, a multi-dimensional platform is provided to facilitate data-driven outcomes processes through assessment, goal development, data tracking, graphing, and re-evaluation. In the embodiments, best practices, successful actions, and plans are identified through automatic data-mining and analysis as well as user specified parameters, algorithms, and analytics.

The illustrative embodiments are applicable to more than just behavioral management. The illustrative embodiments may be adapted to any number of fields, systems, or environments for which an outcome process is identified. The recipient or focus of the outcome process is a subject, the subject may be a client, patient, student, service provider, program, product, service, device, organization, business, department, or so forth. The subject may also be referred to herein as a client.

The illustrative embodiments may be applied to distinct outcome processes and content that involve the same or similar steps as described herein, such as client behavior management, educational instruction, school improvement activities, program evaluation, organizational key performance indicators, financial management, weight management, tracking insurance claims, or so forth. As used herein the term "or" is not mutually exclusive.

The illustrative embodiments may include a health network and system utilized to record, manage, and track progress data. One or more system administrators may manage the system for multiple service providers. As referred to herein a provider is an organization, business, group, school, facility, user, or caregiver, working toward specific goals or objectives. The users may specify goals or objectives. In some instances, goals and objectives are referred to simply as goals. Individuals being cared for may be referred to as clients, patients, students, individuals, or recipients.

Illustrative embodiments allow for full customization of different variables, such as hierarchical structure, subject title, roles, goal content, assessment variables, strategies and interventions, and underlying rules governing data analysis as needed by the user. In another embodiment of the system, the different users may be program administrators, providers, caregivers, IT support, and so forth. The labels specified for different variables and users may be assigned based on roles, levels of function, permissions within the system, and so forth. The illustrative embodiments may be customized to a desired level of functionality and for specific hierarchies.

The illustrative embodiments may be utilized to manage organizational quality improvement efforts and activities. As a result, organizations may more easily record and track progress to meeting individual, group, or institutional goals. In one embodiment, the described system is applicable to a behavioral health system, but is equally applicable to different conditions, environments, and situations. The ongoing behavioral health example is given for purposes of further illustrating the concepts.

In one example, the described embodiments may be utilized to assist and serve children and adults with disabilities, or significant emotional or behavioral challenges. The embodiments may be utilized in a patient-centered model, to provide continuous and coordinated services from early intervention, short-term stabilization, and residential services to substance abuse treatment, outpatient services, educational, and career and technical training. The illustrative embodiments may also be utilized for program or organization evaluation.

In one embodiment, a health network and system may be utilized to provide software as a service (SaaS). For example, a health network provider may make server-level applications, local applications, web programs, and mobile applications available to a number of providers. Individual users may then enter, retrieve, manage, and view information and data through any number of wired or wireless computing and communications devices. The different software may be updated as new versions are released. As a result, comprehensive systems and software services may be quickly rolled out to the providers. The individuals may be added, deleted, or managed from a number of remote locations. In one embodiment, the existing medical records including files and databases may be integrated with the health network and system to ease any transition concerns. In other embodiments, existing paper records may be digitized for utilization with the health network. Information from existing electronic medical records and systems may be uploaded for immediate utilization. The illustrative embodiments may be utilized to communicate with external databases including importing and exporting medical, financial, or other sensitive records if the correct authorizations are verified.

In one embodiment, the health network may utilize a cloud network to provide access. The cloud network may allow the system provider to license the system and software more efficiently. The system provider may control the system hosts, client profiles, security access, permissions, key access, and other controls.

In one embodiment, the described systems and method may be utilized to assess client outcomes to provide data to evaluate a variety of diagnostic, cultural, treatment, and regulatory priorities. Shared and collaborative information may result in team sharing of information for providing automated processes for real-time monitoring of progress and outcomes. The illustrative embodiments provide a systematic data collection and analysis system and process.

The embodiments may utilize a highly structured outcomes analytics program that assists users in collecting, graphing, and analyzing client-related outcome data. In one embodiment, a provider-defined Analysis of Influences Matrix (AIM) is considered to assess factors associated with a lack of progress to substantiate changes to service methodology. The AIM process may be used to determine needs, propose goals to address, and better match service components to optimize outcomes. In one embodiment, the illustrative embodiments may be referred to as Reliable Evidence Based Outcomes Optimization Technologies (REBOOT). The embodiments may be available to professionals, doctors, teachers, and clinicians as well as family members to facilitate the effectiveness of care and service plans. The data may be collected at the client, service, program, and organization levels to drive comprehensive quality improvement efforts. The illustrative embodiments provide a systematic method of pinpointing staff training needs, identifying departmental resources and programming needs, and developing processes to evaluate the utilization of best practices to improve outcomes.

In one example of a health system, goal mastery rates across programs that utilize the described processes and embodiments have improved from 35%-81% and have sustained above 80%. At the same time, coercive behavior management interventions have been reduced dramatically. The resulting increases in both client and staff safety indices correlate significantly with associated cost reductions to the organization. The illustrative embodiments decrease delivery costs despite the increases in sophistication over the existing systems.

The illustrative embodiments may improve client functioning, reduce client and staff injuries, reduce program costs, and mobilize a trans-disciplinary wrap-around system and process that "owns" the actualization of sustainable positive outcomes. The positive results indicate that it is possible to make gains in the independence and quality of life for clients with disabilities, while improving the viability of both the organization and the naturalistic support community as well.

The following paragraphs provide information that help understand the illustrative embodiments and the processes utilized to measure and achieve goals. As used herein, a baseline may be initial data obtained when the identified goal is first implemented. For example, an initial score and date may be obtained as part of the baseline. A mastery level may be the score or achievement required to master a goal or objective. For example, a measurable activity may need to be performed at the mastery level a number of times over a duration of time before the goal is considered achieved.

The duration may be a length measure in time or a number of times an activity is performed at the mastery level or goal is reached. A projected closure date is the date at which the goal will end. The projected closure date is utilized to keep users and clients focused on reaching a designated goal in a reasonable time period. For example, depending upon procedural and regulatory parameters, a projected closure date may be pre-determined (e.g., one year) or may be set by user or agent specification of timeline (e.g., organizational key performance indicators may be set annually). The final mastery window may be the projected closure date minus duration. The final mastery window may represent the last window of opportunity to reach and maintain the mastery level before the goal ends.

The minimum growth line is a graphical line that runs from the baseline date and score (rating on graph) to the mastery level on the date that starts the final mastery window. The end of the minimum growth line starts the final mastery window and indicates the last possible timeframe during which the goal may be mastered before the goal expires. The minimum growth line is a reference point against which ongoing data ratings are compared to assess status and level of progress. The minimum growth line is not a prediction of how the actual data points will present, but simply a reference line against which the actual data points arc compared. Assessing status is determined as data are graphed and compared with the minimum growth line. For example, the system may determine the status automatically utilizing pre-determined rules.

In one embodiment, each organization may set rules that are utilized by the system to determine whether goals and other criteria are met. For example, a client may be deemed to be progressing if when reviewing three of the most recent data points at least two of the three are better than the minimum growth line (e.g., higher than the upward-sloping minimum growth line or the mathematical indicator corresponding to the time period, lower than the downward slanting minimum growth line, etc.) The status may also be color coded. For example, green may indicate that the client is progressing.

A client's goal may be determined to not be on track if two of the three most recent data points are worse than the minimum growth line. If three consecutive data points are worse than the minimum growth line, the third data point may have a status identified as "significant." The significant rating may be marked. For example, the significant rating may be marked in red, highlighted, flash, or so forth. In one embodiment, identification of a significant data point may trigger an AIM-review process to evaluate possible factors inhibiting progress on the goal and to identify changes to the AIM factors that are hypothesized to facilitate progress. The results of the AIM review are noted and a phase change may be noted on the graph. In one embodiment, the phase change may be indicated by a change in a data symbol, color, background color, label, or other indicator.

In another embodiment, a status of mastered may be given when the mastery level is maintained for an amount of time specified in the duration. For example, mastery may be indicated by a purple star around the data point that meets the criteria. Once a status of mastered is given, maintained mastery is a status given for all subsequent data points that reach or are better than the mastery level. Once a status of mastered is given, all subsequent data points that fall worse than the mastery level (higher for downward-sloping minimum growth line and lower for upward-sloping minimum growth line) are given the status of regression from mastery. When three consecutive ratings are given the status of regression from mastery, the third rating is identified as regression from mastery and significant. For example, a data point associated with regression from mastery may be noted with a red circle, and an AIM review is prompted as previously cited. Each service provider may specify thresholds, criteria, or rules that are utilized to determine the differences between statuses. For example, two consecutive ratings or a specified number may be utilized to determine deviations or significance.

In one embodiment, when the goal reaches the projected closure date, the goal is given a final status based on the last status entry. Goal mastery data may be analyzed in any number of ways. Final status rates may be calculated and may be assessed by any level of the agent hierarchy (e.g., by client, by service provider, by service type, by location, organization-wide). Status reports may be generated as needed to assess the current status of goals (not yet ended) by any level of the agent hierarchy. In one embodiment, reports may be generated to provide a listing of all goals whose current status is significant.

The illustrative embodiments may also allow multidimensional analysis of subject, goal, service, and intervention by final status outcomes to generate formulas for best practices by any of these parameters. For example, a specific subject type might be most successful with a particular goal when a specific intervention is provided. Other analyses may indicate typical timelines for reaching particular outcomes by any of these parameters.

FIG. 1 is a pictorial representation of a health system 100 in accordance with an illustrative embodiment. The health system 100 may include any number of systems, devices, or equipment. For example, the health system 100 may utilize existing medical record servers, databases, electronic files, and systems. The health system 100 may also include any number of customized or proprietary systems, software, equipment, devices, or other components that are described herein.

In one embodiment, the health system 100 may include a health network 102 and a management system 103. The health network 102 may include hardware and software components including servers 104, file servers 106, databases 108, and software 110. The health system 100 and the health network 102 are configured to serve numerous customers or providers including Provider A 112 and Provider B 114. Each of the customers may include any number of networks, servers, computing devices, wireless devices, or network equipment, systems, and so forth. In one embodiment, Provider A 112 may utilize a server 116, a computer 118 displaying a graphical user interface (GUI) 120, and an electronic medical record (EMR) 122.

The Provider A 112 may further utilize a network 124 and wireless devices 126, 128, and 130 jointly "wireless devices 132"). Provider B 114 may utilize a network 134, a computer 136, and wireless devices 138, 140, and 142 (jointly "wireless devices 144"). The wireless devices 132 and 144 may be utilized when connected to a network or offline. The information and data may be entered utilizing a keyboard, speech recognition, imaging system, microphones, or any number of other devices or peripherals known in the art.

In one embodiment, the management system 103 is one or more devices utilized to enable, initiate, route, and manage communications between one or more computing and communications devices and providers, such as Provider A 112 and Provider B 114. The management system 103 may include one or more devices networked to manage the health network 102. For example, the management system 103 may include any number of servers, routers, switches, or advanced intelligent network devices. The health network 102 sends and receives the electronic signals through any number of transmission mediums. The health network 102 may include various fiber optics, cables, transmission towers, antennas, or other components for transmitting data, communications, information, and files.

The health network 102 may represent any number of communications networks and connections including wired or wireless networks, data or packet networks, cable networks, satellite networks, private networks, publicly switched telephone networks (PSTN), or other types of communication networks. For example, communications within the health environment 102 may occur utilizing satellite connections, Wi-Fi, WiMAX, cellular networks, and/or hardwired connections, such as fiber optics, T1, cable, DSL, standard telephone lines, Ethernet, power line networking, or other digital or analog communications connections. Any number of communications architectures including client-server, network rings, peer-to-peer, tiered networks, application servers, distributed networks, or other network systems may be utilized.

In one embodiment, communications utilizing the wireless devices 112 and 114 may occur directly or through network devices using communications protocols, such as time division multiple access (TDMA), code division multiple access (CDMA), global systems for mobile (GSM) communications, personal communications systems (PCS), Wi-Fi, WLAN, WiMAX, or other frequently used cellular and data communications protocols and standards. The wireless devices 112 and 114 may include cellular phones, smart phones, personal digital assistants (PDA), mp3 players, laptops, the readers, evolution data optimized (EDO) cards, hybrid devices, tablets, multi-mode devices, and other wireless communication devices and components.

Figure 2:
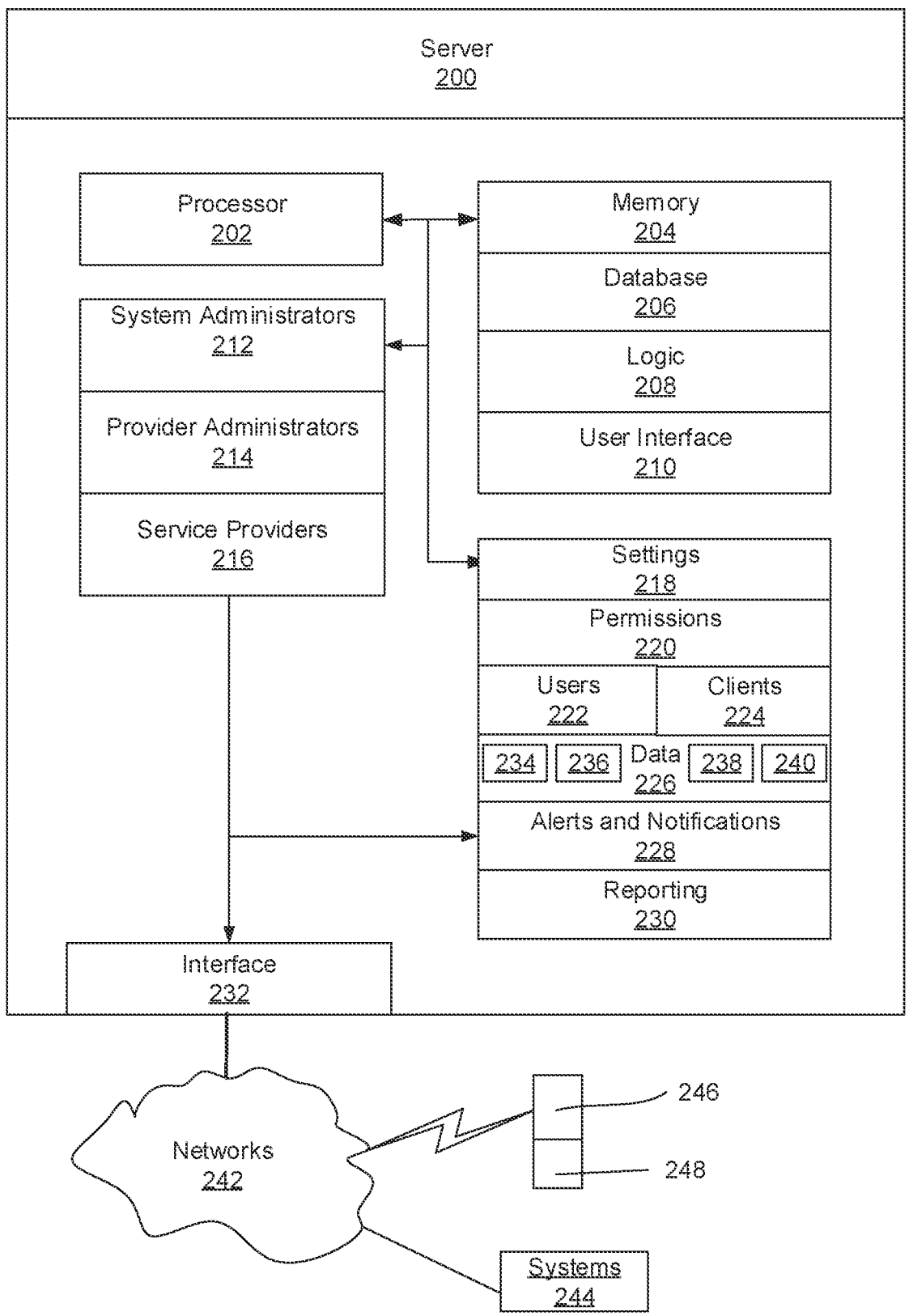
FIG. 2 is a block diagram of a controller in accordance with an illustrative embodiment.

FIG. 2 is a block diagram of a server 200 in accordance with an illustrative embodiment. In one embodiment, the server 200 may include a processor 202, a memory 204, a database 206, logic 208, a user interface 210, system administrators 212, provider administrators 214, service providers 216, settings 218, permissions 220, users 222, clients 224, data 226, alerts and notifications 228, and reporting 230, and an interface 232. The data 226 may include service delivery 234, goals and objectives 236, recorded data 238, and general notes 240. As referenced herein clients are any individual, parties, groups, process, subject, device, or organization on which data is collected.

The server 200 may communicate with networks 242, systems 244, and electronic devices 246 utilizing applications 248. In one embodiment, the server 200 is a computing device or group of networked or distributed computing devices. The server 200 may have any number of hierarchical users including, system administrators 212, provider administrators 214, service providers 216, IT support, support staff, caregivers, and other similar users. In one embodiment, to add any of the described entities, groups, or users to the server 200, any of the following information or data may be required: name (e.g., first, last, username, nickname, etc.), email address, image, mobile telephone number, work number, role (e.g., system administrator, service providers, parent, etc.), user identification, password, designated supervisor, comments, and other related information.

The processor 202 is circuitry or logic enabled to control execution of a set of instructions. The processor 202 may be microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor 202 may be a single chip or integrated with other computing or communications elements.

The memory 204 is a hardware element, device, or recording media configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory may use any type of volatile or non-volatile storage techniques and media.

The database 206 may be utilized to store the data 226. The database 206 may include a database management system such as SQL (and variations), Access, Oracle, and DB2. In one embodiment, the interface 232 may include a transceiver configured to both transmit and receive communications for the server 200. The networks 242, systems 244, wireless devices 246 and applications 248 may represent all or a portion of the health system 100 of FIG. 1, such as Provider A 112 or client 114. The database 206 may be configured for data mining of available information and data as is known in the art.

In another embodiment, the server 200 may act as a web server hosting content that may be retrieved and managed. The illustrative embodiments may be implemented utilizing a web browser for entering, updating, and managing information, goals, activities, and other 226 data. In one embodiment, the software, information, and data utilized by the server 200 may be indexed, archived, or otherwise made available for queries and secured web-based searches. As a result, the users 222 may search the data 226 based on the applicable settings 218 and permissions 220 to determine best practices.

In one embodiment, information, settings, and data utilized by the server 200 is saved or duplicated to one or more redundant systems for backup, failover, or network purposes utilizing any number of backup standards, formats, or protocols. The various components of the server 200 may represent an application that is stored in the memory 204 and executed by the processor to perform the illustrative embodiments. The server 200 may host an application that communicates with other devices executing a local copy or version of the application (e.g., applications 248). Data may be similarly synchronized and shared between applications in real-time or near real-time. As a result, multiple users 222 may be able to edit the data 226 simultaneously or concurrently while seeing the changes made by their counterparts.

In one embodiment, the system administrators 212 may control upload of the provider administrators 214, service providers 216 and clients 224 into the systems of the server 200. The system administrators 212 may be allowed to manage the setup of information, settings rules governing data analysis, and modules for the provider administrators 214. In one embodiment, the system administrators may be prevented from seeing specific types of data. However, in one example, general information, such as effectiveness of the service delivery 234 (e.g., a specific treatment plan) and the associated data 226 may be made available to the system administrators 212 for further enhancing the server 200 and providing additional actions and best practices to a number of clients that the system administrator 212 manages. In one embodiment, different provider administrators 214 associated with different organizations may be assigned to each of the system administrators 212 as a caseload. Service providers 216 may be similarly assigned as needed.

Provider administrators 214 may be provided unique access to the server 200 through a user interface 210. The user interface 210 may be represented by programs, applications, secure access protocols or systems made available through the server 200, such as the user interface 210, or alternatively, the applications 248, or the systems 244. The user interface 210 may present a dashboard or portal for managing the described information and data. In one embodiment, the provider administrators 214 functions of the user interface 210 may be accessed through a desktop application interface or webpage. The provider administrators 214 may have complete read/write access to the user accounts represented by the service providers 216 including the settings 218, permissions 220, clients 224 and data 226. In one embodiment, the user interface 210 may display any number of icons, images, drop-down menus, videos, hyperlinks, internal links, scroll wheels, tabs, Windows, or other selection or display components.

The provider administrators 214 may have the capacity to add, edit, archive, and delete users 222 and the clients 224. The provider administrators 214 may have access to data 226 including service plans 234, goals and objectives 236, recorded data 238, and general notes 240. The user interface 210 may also provide user access for monitoring a patient's behavioral status. The service providers 216 may represent supervisors or may also be users 222 associated with one or more clients 224.

In one embodiment, the status may be associated with alerts or notifications 228 triggered by built-in system monitoring logic, such as reporting 230, that is intended to guide service providers 216 in their administration of service plans, tracking of recorded data 238, and service provider communications. The server 200 stores and provides access to every recorded service providers 216 interaction with the client file (e.g., updates, general notes 240, recorded data 238, event-triggered notifications, etc.) included in the data 226 or specific to the clients 224. As a result, the service providers 216 may log all activities within a file thereby allowing other service providers 216 to view the activities based on the pre-established settings 218 and permissions. For example, business, hospitals, or schools may have sharing agreements for exchanging data while still complying with the applicable laws and industry practices. Provider administrators 214 may also post public notes, comments, alerts, and notifications, associated with data 226 being recorded by the server 200 by the users 222 through the user's accounts. For example, public notes may be accessible to the related service provider 216.

Provider administrators 214 may manage their team of service providers 216 who work directly with clients 224 to administer information and data, such as goals and objectives 236. The provider administrators 214 may have complete access to the service providers 216 and the clients 224 to assign the clients 224 to individual service providers 216 through the user interface 210. In one embodiment, the service providers 216 represent authorized users able to access all or portions of the server 200 applicable to the service provider, view elements of the service plans 234, view and add goals and objectives 236 for clients 224 that are associated with the service providers 216 to enter data, information, statistics, and record audio and video permitted by the provider administrators 214.

The users 222 may utilize the applications 248 (e.g., Android, iOS, Windows, etc.) to communicate with the user interface 210 to view data 226. For example, mobile applications executed by the electronic devices 246 may communicate the data 226 that is saved to the server 600. The user interface 210 may provide an easy to navigate and user friendly interface with quick search utilities and filters (e.g., location, caseload, etc.). The user may be granted read only/write access with the capacity of adding new instances. In one embodiment, changes to the client's information, such as service plans 234, goals and objectives 236, recorded data 238, and general notes 240 may be required to be reviewed by supervisors prior to submission. The users 222 may represent support staff, parents, professionals, and in some cases the clients 224 themselves may be given full or limited access to their own data 226. In one embodiment, the users 222 may represent the full hierarchy of individuals associated with clients 224 from administrators to support staff. From each client-dashboard available through the user interface 210, the service provider 216 may have access to a log of interactions associated with the data 226 (e.g., data collection, inactivity alerts, etc.).

The communications with the server 200 are secured for sensitive electronic protected health information and to comply with applicable laws, such as HIPAA. Communications with the server 200, whether in real-time or file transfers, may be encrypted or utilize other secure data transmission protocols (e.g., SSL, https, security certificates, etc.). The server 200 may also be configured to communicate with any number of databases 206 or systems 244, internal or external, maintained or accessible by the provider administrator 214, such as electronic client records databases. The applications 248 may record information and data even if one of the networks 242 is not currently available or if the wireless devices 246 and the systems 244 are offline. Synchronization methods and modes may be utilized as necessary (e.g., cloud synchronization). In one embodiment, conflicts and synchronization of information may be presented to the service provider 216 or provider administrators 214. In one embodiment, variance conflicts may be resolved by an automated processes or based on input from the provider administrator 214.

In one embodiment, users accessing the server 200 through the user interface 210 may be able to view clients 224 by location, caseload, or assignment. For example, the clients 224 may be associated with one or more locations, services, or programs. The locations may allow for further sub categorization, such as national, regional, or local programs. In one embodiment, provider administrators 214 may be able to see clients 224 associated with their respective service providers 216 or treatment team. In one example, the service providers 216 may be presented with a default list of clients 224 that have most recently been reviewed at login with options to search by location, client name, or other identifying information.

In one embodiment, the data 226 may further specify strengths and abilities, preferences, assistance or accommodations, such as environmental supports, activities of daily living, communication, and other, instruction and intervention strategies, and health and safety information, such as medication and special monitoring or precautions. Each of the authorized users may be able to view additional details by making further selections, such as double tapping a portion of the client data 226 presented on a touchscreen. The data 226 may be further customized or displayed in response to a user selection. For example, in an application focused on health and safety information of a client may include additional information, for example, regarding seizures, bowel movements, special diet, exercise program, and one-on-one services that may be further explored or reviewed.

In one embodiment, by choosing a heading, the service providers 216 may be presented with information for specific goals and objectives 226. For example, in a behavioral health field, the goals and objectives 226 may include areas, such as coping skills, fine motor skills, and physical aggression. The user may utilize a goal wizard or management function to be able to enter headings as well as detailed descriptions or narratives associated with each heading in a hierarchical format. For example, each of the goals and objectives 236 may include a main heading, a start date, a projected closure date, a goal description, a goal narrative, a lead service provider, a data collection method, email notifications (e.g., for individual users associated with the specific client or information for the client), function, and options. Goals may be opened and closed out at any time and may be viewed in separate files, such as active and archived. In one embodiment, the data 226 may be associated with mastery scores, baseline information, and objectives. The information may also be prioritized or color-coded as needed.

In one embodiment, the alerts and notifications 228 may be configured to communicate information. For example, any number of alerts and notifications 228 may be communicated through the interface 232. The interface 232 may be configured to communicate with wired and wireless networks. As a result, the alerts and notifications 228 may represent emails, text messages, in-application messages or alerts, audio, video, picture, or text messages, streaming communication sessions, or other similar alerts, messages, or communications that are sent in real-time or near real-time. The alerts and notifications 228 may also include hyperlinks back to the original source of the alert or notification for easy review and to address further action that may be needed. The alerts and notifications 228 may also utilize a feed to send information to users. The feed may be similar to a newsfeed and may be organized by subject date in which users may create dialogues of streams of information related to a particular topic for a client. Individual users may add to each other's feeds or may create new ones. The user may also be able to view and re-enter the most recently accessed areas of an application utilizing a history or most recently utilized function.

In one embodiment, the alerts and notifications 228 may include a client name, goal/objective name (e.g. decrease physical aggression, 100% customer satisfaction, register balance, etc.), date of rating, name of user, and link back to the rating. If there are multiple significant ratings in a row the alert may include a note specifying how many (e.g. there are now 6 weeks of activities or data points that are off the minimum growth line). Alerts and notifications 228 are also meant to include positive information, such as a mastered rating that may include a client name, assigned providers, date of rating, name of user, and a link back to the rating. The links may represent hyperlinks or metadata for retrieving the information in a web browser application or through an electronic access system as is herein described.

Certain activities, once configured, automatically trigger the alerts and notifications 228 to send out information and request a response. For example, every time that a user is required to perform a restraint in a health facility, an alert may be sent out to a specified group of providers, users, and administrators to best care for the client restrained as well as for liability and auditing purposes. The alert may indicate the client name, time, response required, and name of the person entering information and any specific notes or comments. The alerts and notifications 228 may also send out alerts for data exceptions. For example, if data are not received for three weeks in a row, an alert may be generated indicating the reasons for the exceptions, the user name entering the information, and a link hack. The alerts may be automatically sent to supervisors, administrators, or other designated parties.

In one embodiment, the reporting 230 may be utilized to communicate charts and graphs, track and record progress, determine timeliness of data entry, and other information. The reports may be based on clients, location, service provider, region, or date ranges. The reports are configured to be customizable to track and display a variety of process mechanisms input or entered by a user or administrator based on the specific needs for which the illustrative embodiments are utilized. In one example, the reports may be selected to report, significant scores with no AIM review comment, two or more significant scores in a row, AIM distribution by a client, location, and provider, missing data for more than a time period, or other relevant information. The reports may include quick snapshot reports as well as long-term and comprehensive reports.

The reporting 230 may be configured to present information graphically utilizing bar charts, pie charts, scatter plots, line graphs, and other similar display messages. Graphical representations may include information embedded in multiple layers for automatically displaying additional information to a user (e.g., displaying identifying information and statistics when hovering over a data point). The reporting 230 may also display information statistically, utilizing percentages, in standard document formats (e.g., Word, Excel, Google Docs, etc.).

In one embodiment, the user may set a date range for information to be displayed and specific goals/objectives active during the date range may be automatically entered or selected by the user for display. A current status may indicate the status for a client or subject for all ongoing activities. A final status report may graphically display goals the final outcome of goals and associated activities that were closed during a specified data range.

As disclosed herein, the reports may include code categories, which may include mastered, maintained mastery, and regression from mastery. Progress toward a goal may also be displayed with information, such as progress (also progressing, or on track), not on track, and not on track/significant. Alternative reporting code categories may include "plan expired", "achieved mastery", "closed prior to end date", "ready for discharge", "premature discharge", "entered in error", "discontinued", "removed", or other similar codes. Some of the codes may be required by other electronic tracking systems and may be added, removed, or translated from existing code categories as is needed.

The reporting 230 may also specify an overall total based on all participating users and organizations. Overall totals may be generated by code category and by goal service type (e.g., overtime, education, etc.) as well as provider. Similarly, organization, sub-organization, and location specific reporting may also be performed by code category, goal service type, or provider. The various reporting abilities of the illustrative embodiments are configured to apply to privacy laws, such as HIPAA, and may require waivers or authorizations to share information even within an organization for treatment purposes. For example, sub-contractors or other parties may perform reporting as needed or required.

The reporting 230 may also generate reports based on an identified group of clients automatically or manually selected by a user. For example, the report for the group may show the client, service, goal/objectives, current status, and current status date. The reporting 230 may allow a user to drill down from the organization level to the client and associated goal level.

Additional information available through the reporting may include length of time of goal implementation until mastery, specified as an average time until mastery calculated from a baseline date to a mastered date and may be determined by goal service type, goal description for total, organizational, sub-organization, and location.

The reporting 230 may also allow for monitoring reports that are established to include a number of variables and may be displayed or exported in any number of formats. The monitoring reports may be automatically generated and available or communicated to the user. For example, a monitoring report may indicate goal/objectives with the most recent rating that is significant within the past x number of weeks. The reports may show sub-organization, goal/objective, provider, date of significant rating, AIM review comment associated with the significant rating, and so forth. Other monitoring reports may include goals/objectives with x number of significant ratings in a row (e.g. six consecutive points off of the minimum growth line). The monitoring reports may also retrieve all active goals/objectives organized by client, service, most recent status, and status date. Status dates that are older than two weeks old may be indicated, such as being shown in red. The monitoring reports may also specify goals/objectives that are within x number of weeks of the final mastery period.

In one embodiment, the AIM is a process utilized to analyze the content of any outcome process. For example, AIM may represent an algorithm that is executed by the logic 208 to retrieve and analyze information as needed by any number of parties. AIM is fully customizable depending upon the content established for a group or organization. In the system administrators 212 may be able to identify key factors that most influence the outcome of the selected content. The variables may then become the different factors of AIM for that application on the server 200.

The AIM process may be used in the initial site assessment of a "client" or "subject" based on the parameters identified for the content of the client's outcome process. In one embodiment, the AIM process is smart and automated for driving questions based on answers from previous questions. As a result, various users are focused toward best practice assessments of the content. For example, AIM may also provide suggestions for goals, objectives, and interventions based on the information provided on the subject. Broad data mining may feed the AIM process based on the data 226 and other information stored by the server 200 to narrow the scope of questioning two factors found to be the most associated with positive outcomes.

The AIM process may also be used at any point during the data analysis process when the subject is not making sufficient process (e.g. a determination based on the minimum growth line line). For example, if a subject, such as a client in a behavioral health facility, has three data readings that are off the minimum growth line, the third rating is considered significant, and the user is prompted to conduct an AIM review. The AIM process may also generate suggestions for interventions to facilitate the progress of the subject.

Figure 3:
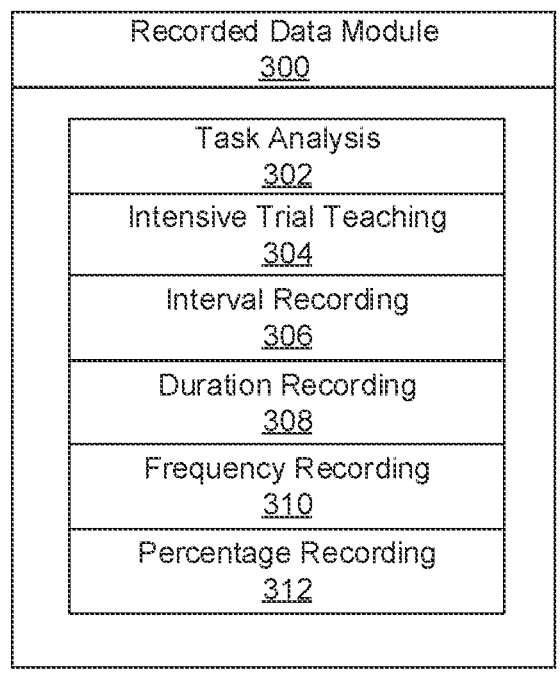
FIG. 3 is a block diagram of a recorded data module in accordance with an illustrative embodiment.

FIG. 3 is a block diagram of a recorded data module 300 in accordance with an illustrative embodiment. The health system as is herein described includes a number of different methods of recording client data. There are a number of different data collection methods available to provide flexibility and accuracy in data collection design.

In one embodiment, the recording behavior module 300 may include task analysis 302, intensive trial teaching 304, interval recording 306, duration recording 308, frequency recording 310, and percentage recording 312. The different aspects and features of the recording behavior module 300 may be combined in any number of combinations and formats. In one embodiment, the recorded data module 300 includes data, information, numbers, statistics, pictures, descriptions, or other content that may be received through a goal wizard or management feature.

In one embodiment, the recorded data module 300 may be presented to the user as part of a graphical user interface (GUI). The graphical user interface may be presented as part of a mobile application, web program, electronic device, or a communication session.

In one embodiment, each data collection method may include a specific set of rules related to the data entry and visual presentation of information, data, graphs, and reports available through the health system. In addition to this information, graphics, such as goal mastery graphs, may demonstrate user data results across different data collections episodes and in conjunction with each service goal. The setup and configuration of the information and graphics may be managed by the administrator. The display of the information and graphics may also take into consideration specific device orientation, display options (e.g., graph layout and corresponding information may be presented in a first configuration when viewed in a landscape mode and in a second configuration when viewed in a portrait mode), display limitations, permissions, and so forth.

In one embodiment, each graphic is the result of specific formulas and calculations. Each user may submit the features, parameters, criteria, or calculations utilized to generate graphics, such as performance measurement charts. In one embodiment, the graphs may be produced in real-time as data are entered or may be set to display historical data. A rules engine may be configured to dynamically handle information and data entered into the health system.

The recorded data 300 may be tracked to determine whether a particular goal or objective is met. In one embodiment, this option may be controlled by any number of authorized users that are assigned to a client. All or portions of the recorded data 300 may be viewed at once to make analysis accessible and thorough.

In one embodiment, the data collected in the recorded data 300 may include an antecedent trigger button (e.g., may indicate triggers for patient behavior), location, response (e.g., programmed list of responses providers and/or caregivers made, customized fields for entries including restrictions, next actions, alerts for restricted practices, etc.), reinforcement options, severity button (e.g., ratings, description, etc.), and comments (e.g., text, audio, video, etc. The information may be presented automatically or based on the type of information presented.

Any number of data collection systems and methods may be utilized to collect patient data and measure goals and objectives. In one embodiment, all data collection options may be available to the service provider during set-up, but then only the relevant information and fields may be shown for the actual data collection.

In one embodiment, in the setup for task analysis 302 there may be two settings for that request a hierarchy and task. Task analysis 302 may also be referred to as ratings. To set up the prompt hierarchy an administrator or user may identify a field including a number of prompt types or numbers (e.g., hand over hand, touch prompt, gestural, verbal, independent, etc.), additional comments, color code or priority, and so forth. Task analysis 302 may be set up by establishing the number of tasks or steps, a narrative label for each step, optional comments for more description if needed, and scores. In one embodiment, the tasks may be associated with a particular goal or objective.

In one example, the fields included during task analysis 302 may include any of the questions and request further detailed in the text of FIG. 7.

In one embodiment, task analysis 302 may specify dates or times during which data are collected each day, week, or month. For data collection, the user may be able to see each task and step paired with the prompt hierarchy. For example, the user may select a task and then a prompt level. FIG. 4 provides a chart 400 illustrating data collection in accordance with an illustrative embodiment. For example, the chart 400 illustrating levels of prompt that may be required for a patient to perform the specified tasks. Any number of tasks or objectives may be utilized and the chart 400 of FIG. 4 is given as an example.

The chart 400 may further illustrate a score 402 that may be calculated based on the level of prompts required for each task. For example, the calculation may be made by adding up the scores for the chosen prompts and dividing that number by the highest score possible. In one embodiment, the score may be reported as a percentage. For example, the score recorded may be 51%.

The illustrative embodiments may present any number of graph or chart options for the specified goal or objective. For example, by default, a percentage score may appear with the graph. The user may also be presented with the option to generate graphs for each individual task or several tasks over time to evaluate client progress. In one embodiment, the user may select the task to graph, and each graph may be generated utilizing the distinct data and formatting (e.g., color, graph type, etc.). In one embodiment, the graph schedule may be set by an administrator for graphing each entry. As a result, each data point on a graph may immediately be saved as well as displayed.

Turning again to FIG. 3, the user may be presented with additional options based on the data collection schedule. For example, the user may select to graph each entry or average the entry results. For example, if the data collection schedule is set to three times per week, then once all three data collections are made in a week, the score may be calculated and graphed. In another embodiment, weekly determinations may be made utilizing seven-day intervals starting with a baseline date. If there are not enough data collection episodes entered to total the number identified during the data collection schedule, the calculations may not be made and an alert signal may be displayed next to the graph indicating the lack of additional data collection points.

In one embodiment, if a specified time period ends without a specific number of data collection episodes being collected, an email or other alert may be sent to the service provider and/or the identified supervisor. In one embodiment, entries may be automatically recorded and saved as input. In another embodiment, the data collection displays may include save and edit buttons. Different versions of the recorded information may also be saved to ensure that data are not improperly overwritten. In addition, users may not be able to edit previous entries and only supervisors or administrators may be able to make such changes. The user may also be presented with a comment button to record a comment related to a data collection episode.

In one embodiment, the intensive trial teaching (ITT) 304 is a data collection module and method. Intensive trial teaching 304 may also be referred to as repeated trials. The ITT 304 and other data collection methods may have multiple modes, such as instructional and testing. While data in both modes may be viewed, in one embodiment, only data entered into the testing mode may be graphed. As previously described, the ITT 304 utilizes a prompt hierarchy, labels, fields (e.g., answer choices, yes, no, etc.), field size data collection schedules, and other options (see FIG. 4 and the associated description). The ITT 304 may also be scored as previously described.

In one example, the fields included during ITT 304 may include any of the questions and requests further detailed in the text of FIG. 8.

In one embodiment, the interval recording 306 may include different types, such as whole, partial, or momentary time sampling (e.g., fixed, variable, etc.). The different types of interval recording 306 may include observation duration, length of interval (e.g., seconds, minutes, etc.), options to enter response choices (e.g., yes, no, custom label, etc.), and selection for inclusion in a score selection. In one embodiment, an alert or indicator may be made at the end of each interval. For fixed momentary time sampling, the signal may be given at the conclusion of the time. For variable momentary time sampling, the signal may be given at random times within the identified time. If the interval is specified as 30 seconds, then the signal may be given at any point between one and 30 seconds for each separate interval.

The interval recording 306 may also include other options for pausing and resuming passage of time, indicating multiple behaviors displayed at once, indicating passage of time, summary of intervals, location, save and edit options, and comment options. After setting up interval recording 306 as a data collection method, an auditory, tactile, or visual signal may be chosen to alert the user as to when to collect data. When the signal is presented, the user may rate the client based on the parameters set and enter the data.

In one example, the fields included in the interval recording 306 may include any of the questions and requests further detailed in the text of FIG. 9.

In one embodiment, the duration recording 308 may include fields for starting and stopping, a current record time, data recorded (e.g., hours, minutes, seconds to hundreds of a decimal), data collection schedule options, graph schedule options (see FIG. 4), and cumulative duration calculations. The duration recording 308 may also include a field for location and optional comments.

In one example, the fields included in the duration recording 308 may include any of the questions and requests further detailed in the text of FIG. 10.

In one embodiment, the frequency recording 310 may include a number of options, such as duration of data collection. Frequency recording 310 may also be referred to as counts. In option 1, the frequency recording 310 may include a daily start time and end time. In option 2 the frequency recording 310 may include a specific interval including designations for hours and minutes, and option 3 may include a specific setting. In one embodiment, option 1 may display information that says ""Data collected from_____ to_____" (times)", option 2 may display information that says "Data collected for_____(minute) interval" with a displayed start time and start button, and option 3 may display information that says "Data collected in_____." The frequency recording 310 and associated data collection options may allow a user to provide a user selection, voice input, or tactile input indicating the number of times a behavior or skill is shown by the client, an indication that no observed behavior was seen during the data collection, and an indication that data collection was not available and an associated comment specifying the associated reasons. Frequency counts may also show a number of items (e.g., returned retail items) or other number of times an event occurs (e.g. customer complaints). Graphing options may be presented to the user as was previously described. In addition, the user may be presented with the opportunity to utilize a scatter plot. The scatter plot may require additional information, such as a date range, time range, and time interval. The graph may then display data that are recorded within the entered specifications. If only one data point is entered on the graph, the data point may indicate the frequency of the behavior within the interval. The data point may be expanded or provide additional details to understand the specific information.

In one example, the fields included in the frequency recording 310 may include any of the questions and requests further detailed in the text of FIG. 11.

In one embodiment, the percentage recording 312 may be set up to include fields for the number of questions/opportunities, number correct, and percentage correct. In one embodiment, the percentage recording 314 may include labels, number of labels, overall score (e.g., percentage, time, frequency, etc.), and individual scores for tasks. The percentage recording 314 may also be displayed as previously described.

In one example, the fields included in the percentage recording 312 may include any of the questions and requests detailed in the text of FIG. 12.

In another embodiment, the illustrative embodiments may utilize an optional reinforcement recorder (RR) that may be utilized with any of the recording methods of FIG. 3 or the illustrative embodiments. The reinforcement recorder may be set to prompt a user to provide reinforcement to the subject on a scheduled or random basis. Two types of reinforcement recorders are provided. The first reinforcement recorder may be associated with a particular subject and goal. The user may program specific reinforcement options or procedures to be provided to the subject dependent upon performance accuracy or at a fixed or variable schedule. In one embodiment, based on the set-up of the reinforcement recorder, the user may be prompted to provide the reinforcement and may be given the options of reinforcement available to that subject. The user may then indicate which type of reinforcement was provided. Reinforcement provided dependent upon performance accuracy may be noted along with other data collection information for that episode or record. The system may log the reinforcement recorder data for analysis purposes.

In another embodiment, a second reinforcement recorder may be available for general use by the user. This reinforcement recorder may not be associated with a specific subject. The second reinforcement recorder may be programmed to provide a prompt for reinforcement on a fixed or variable schedule and provide options for reinforcement type. When the prompt is given, the user may apply the reinforcement to the subject and/or group of subjects depending upon how the user wants to apply the function. The user may be able to designate the recipient(s) of the reinforcement and the type of reinforcement provided. For example, the recorded data module 300 may log the reinforcement recorder data for analysis purposes.

In another embodiment, the data collection methods of FIG. 3 may utilize a goal bank for optional use by other users with any number of goal types. The client administrators may specify which information is placed in the goal hank. The goal bank may provide a way of retrieving goal descriptions and the associated tasks for review, modification, and acceptance by any number of users in the way to record each update to the goal.

In one embodiment, the system may have two banks or memories to store goals and associated objectives, data collection methods, and interventions. One bank may be specific to that agency or organization and the other bank may be available to all-related organizations. For example, the banks may be used pending administrator access and permissions. Users may be given the option of placing self-created goals into the goal hank as approved by the Administrator. There is also the option for requiring Administrator approval for all suggestion goals prior to acceptance into the Bank. The AIM process may generate a list of relevant goals from the goal bank. Users may also go into the bank when setting up a goal without going through the AIM process. The Goal Bank may be sorted by Service/Type, Goal Name, and/or by typing in keywords. A generic form of the banked goal may pull in with fields requiring customization for that subject. The customizable fields may be the other fields described with respect to the goal wizard.

In one embodiment, the goal mastery graphs or other graphs may have a number of components that may be managed utilizing a goal wizard and other management feature. The user may set a number of variables during graph set-up, including the Y axis labels, baseline data and date, mastery level, mastery level duration, and projected closure date. The system may automatically calculate a final mastery period by moving hack the targeted date by the target rating duration. A minimum growth line may be automatically added as a straight line from the baseline rating and date to the target rating and the beginning of the final mastery period. Ratings entered on the graphs may be colored coded to indicate their status. Data points of significance may be identified by a filled red circle. Data points that satisfy the mastery level and duration may be identified with a purple star.

The user may also be presented with options for entering other data criteria, value or number specifications, and customizations. In one embodiment, status may be automatically determined and displayed for each of the goals and objectives. The status may include any number of rules, criteria, parameters, or thresholds for calculation and display. The status may also be color-coordinated. For example, progress may be noted in green, lack of progress may be noted in orange, a significant lack of progress may be noted in red, and mastery or maintained mastery may be noted in purple. Regression from mastery may also be noted by color. Data points may be determined as significant utilizing a standardized rule of three consecutive points insufficient to the minimum growth line or a customized set of rules determined by the provider administrator.

The user may be presented with other options for picking multiple goals/objectives to graph in a single graph, show data or hide data, view last three data points, or zoom in to a particular data point to see all enter information relevant to that data collection episode.

In one embodiment, data points of significance may be utilized to generate an alert. For example, identified users may receive a notification within the system or an email, text message, in-app message, or other alert. In one embodiment the email may include the service provider's name, client's name, goal description, reason for notification, the rating date and any review comments entered for the rating that prompted the notification. The alert may also provide a direct link back to the data collection episode entered in the system.

The illustrative embodiments may be configured to receive comments and reviews. In one embodiment, in response to determining a data point is significant, a review may be prompted or required. In one embodiment, a review may be referred to as an Analysis of Influences Matrix or "AIM Review" and prompt the user to review and document factors associated with lack of progress. The user may also be presented with options to select an intervention change or no change. Information entered in response to intervention change may be prioritized and marked for review and subsequent alerts.

The illustrative embodiments may be applied to any number of performance management methodologies, such as drug rehabilitation, smoking cessation, physical therapy, medical and behavioral treatments, weight loss, addiction recovery, hotel management, and so forth. In one embodiment, the illustrative embodiments may compile information and data from any number of clients to provide decision-support based on the compiled data. For example, based on research and development, new practices, medications, or service plans may be suggested based on the individual or aggregated recorded data. As a result, services may be adapted in real-time based on dynamic learning from aggregated data. Reporting may be performed without compromising the privacy of client information and data or violating applicable laws. For example, the identifying information, such as client name or location, may be removed from the aggregated data when compiled to provide for anonymity. In addition, the removal of identifying information may ensure that inherent biases, assumptions, inferences, or statements are not promulgated. As a result, more and more clients may utilize the systems and methods herein described increasing the amount of data and accuracy even more.

In one embodiment, the compiled data may be mined utilizing relational database management systems. The data may also be searched utilizing key word searches, Boolean searches, wild card searches or other similar search protocols, strategies, and algorithms. The generic compiled information may also be sold by a system administrator (or alternatively to service providers or other designated parties) to organizations, universities, drug manufacturers, governments, or other parties to encourage development of new treatments.

Figure 5:
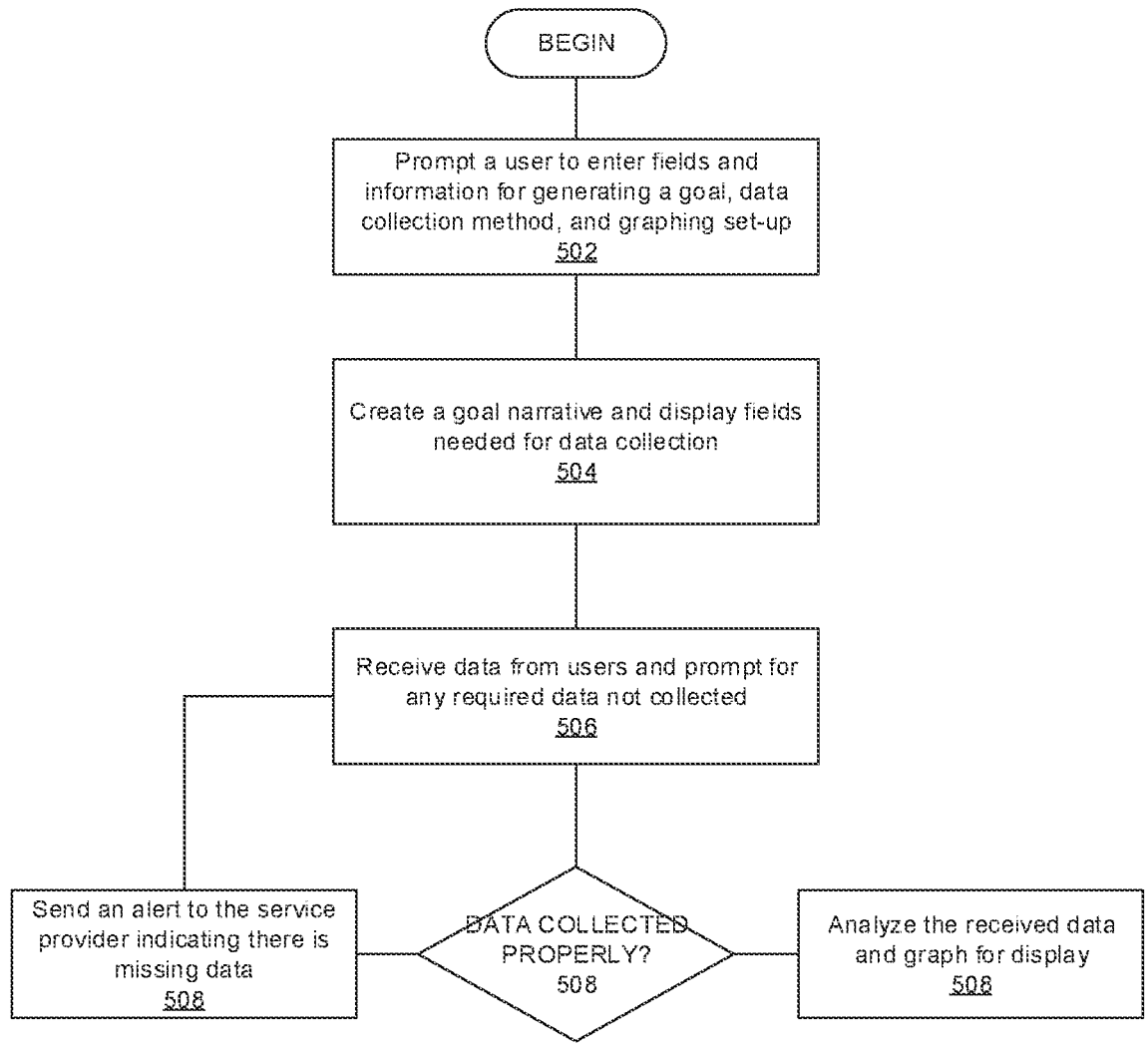
FIG. 5 is a flowchart of a process for generating a goal in accordance with an illustrative embodiment.

FIG. 5 is a flowchart of a process for generating a goal in accordance with an illustrative embodiment. In one embodiment, a goal manager or wizard may compile information that is utilized to generate a goal/objective. The process of FIG. 5 may be implemented by a server, application, device, or combination of communicating elements referred to as a system. In one embodiment, the process may begin by prompting a user to enter fields and information for generating a goal, data collection method, and graphing set-up (step 502). For example, a series of probes or questions may guide the user through completing fields that may generate the goal/objective narrative, data collection method set up, and graphing setup schedule. Step 502 may help ensure all elements are included in the goal/objective narrative to make specific, objective, and measurable goals. The process may also ensure information is entered to define how the process facilitates data collection, graph set-up, graph scheduling, and alert/notifications associated with these processes. The goal Wizard may distinguish between long-term and short-term goals and objectives.

In one embodiment, the following fields may be included in the process of step 502: i). Service/Provider Type—customized by a user, ii). Designation of "Increase" or "Decrease" content or activity, iii). Field for entering "Condition" under which the goal/objective may be measured, iv). Field for entering content assessed (e.g., skill/behavior, actions taken, documentation, etc.). This field may capture what the goal/objective is designed to measure, and v). Field for entering data collection method. In one embodiment, a number of options are provided: Task Analysis, Intensive Trial Teaching, Interval Recording, Duration Recording, Frequency Recording, and Percentage Recording. Based on which data collection method is chosen, additional fields are generated to drive information needed for that type of data collection.

Next, the system creates a goal narrative and display fields needed for data collection (step 504). The data collection options may depend on the type of data collection method and the responses entered for the associated fields (e.g., in step 502).

Next, the system receives data from users and prompts for any required data not collected (step 506). The system may automatically score the data based on the rules associated with the data collection method and responses may automatically graph the data on the graph.

Next, the system determines whether data are collected properly (step 508). The determination of step 508 may be made based the data collection method. For example, the system may require that three entries are received per week and if only two are received, the data are not deemed to have been collected properly.

If the data are not collected properly in step 508, the system sends an alert to the service provider indicating that there are missing data (step 510). During step 508, the system may also indicate that there was insufficient data collected during a time period to the extent a graph is automatically generated or generated based on a user request. For example, any incomplete graphs may be automatically marked as such. After step 510, a user may correct the lack of data by submitting data that are received by the user. The submission may be made through a website, application, or any number of devices.

If the data are collected properly in step 508, the system analyzes the data and graphs the data for display (step 512). In one embodiment at the end of the process of FIG. 5 that may be performed by a goal wizard, the option is given to customize the data analysis fields if applicable. If this option is chosen, the user is prompted to identify the rules for determining "status" and "significance" by completing the following questions: i). Regression from Mastery: _____consecutive data records off MGL, ii). Progress: _____ out of =>upward MGL/=<downward MGL, iii). Not on Track:_____out of_____=<upward MGL/=>downward MGL, and iv). Significance:_____consecutive points that are Regression from Mastery—_____Consecutive points that are Not on Track.

For behavioral-type goals that are marked as "decrease," in addition to the data filed associated with the type of data collection method, the following questions are provided as well: i). Severity—option for On Off (* Standard rating scale of severity is provided but may be customized), ii). Response—offers limitless number and fields for Label and Description for each, iii). Antecedent/Triggers—offers limitless number and fields for label and description for each, iv). Function—Offers options for Obtain, Escape, Automatic, and Attention and fields to write descriptions for each.

Figure 6:
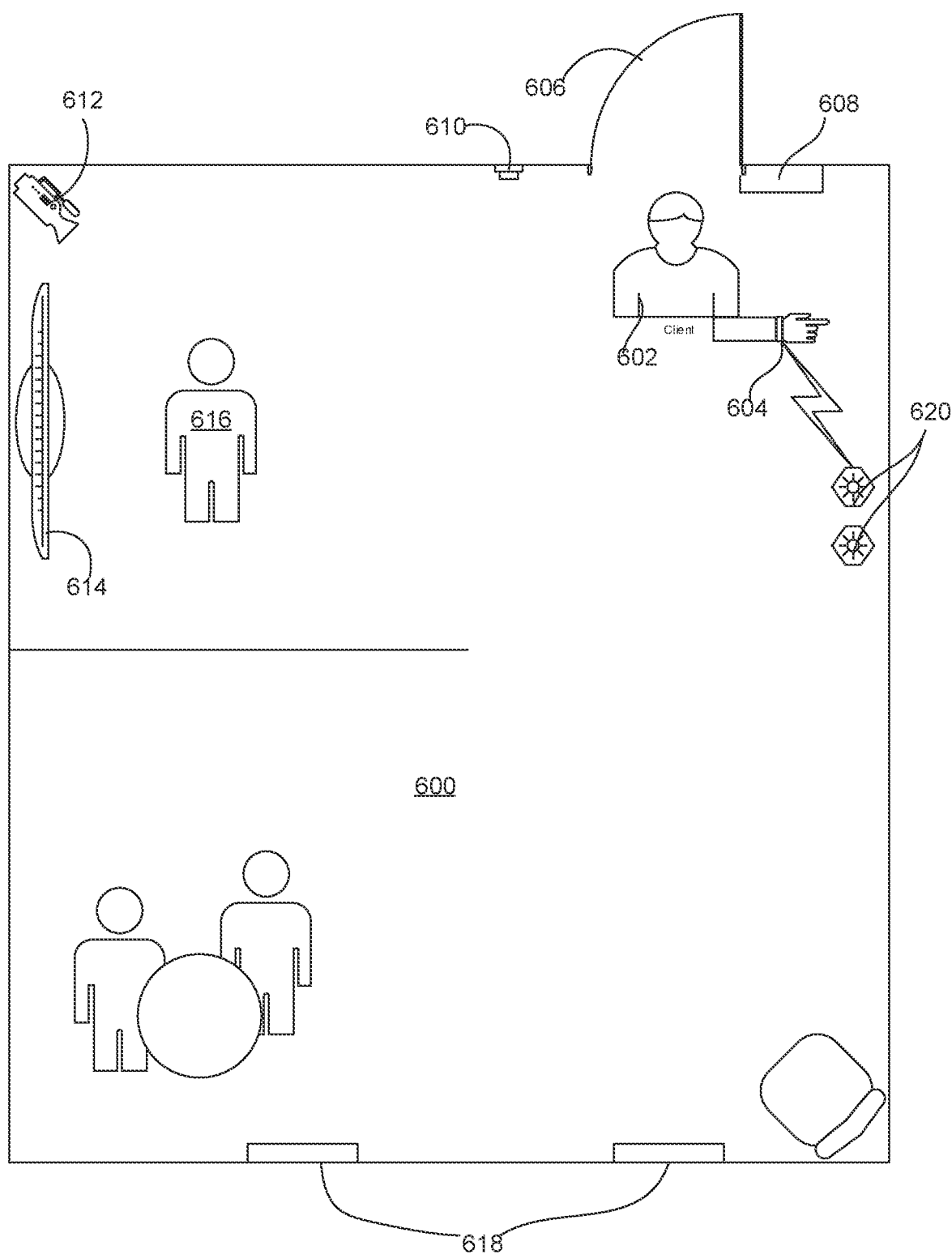
FIG. 6 is a pictorial representation of a monitoring environment in accordance with an illustrative embodiment.

FIG. 6 is a pictorial representation of a monitoring environment 600 in accordance with an illustrative embodiment. The monitoring environment 600 represents any number of facilities, buildings, or conditions in which the illustrative embodiments may be utilized. The monitoring environment 600 may be utilized to determine the location of any or all individuals within the facility as well as determine user and environmental conditions. For example, the monitoring environment 600 may represent a group home, a hospital, or business. The monitoring environment 600 may include any number of components including a client 602, a communications device 604, a door 606, a scanner 608, a panic button 610, a camera 612, a display 614, a user 616, speakers 618, and sensors 620.

In one embodiment, the panic button 610 is configured to set off an alarm or notify everyone or previously identified individuals in the event that there is an event that demands immediate attention. The panic button 610 may be utilized by any number of users or clients in proximity to it. The associated alert may be broadcast universally or selectively. For example, the panic button 610 may be activated in response to a heated argument between two clients and may be communicated to individuals assigned to address security issues or arguments. In another embodiment, the communications device 604 may include a panic indicator that may be relayed to the panic button 610 for communication to the designated location and parties. For example, logic may indicate specific individuals or groups of individuals that receive an alert based on a detected action, location, time of day, or so forth.

The monitoring environment 600 may include any number of rooms, furniture, separators, other individuals, or so forth that are not specifically called out. For example, the client 602 may enter the monitoring environment 600 through the door 606. In response to entering the door 606, the communications device 604 and the scanner 608 may communicate to document the location of the client 602. In one embodiment, scanners at the entryways to distinct portions of a building or room may indicate the general proximity of the client 602. The information associated with the monitoring environment 600 may be stored in any number of databases, memories, or electronic storage systems for permanent or temporary access. Positive or negative alerts may be generated in response to criteria or parameters associated with the location of the client 602.

The communications device 604 may represent a wireless communications device or personal signaling device. The communications device 604 may be waterproof, durable, and shock resistant. The communications device 604 may be freely removable or may be secured to the client utilizing a specialized tool. In one embodiment, the communications device 604 may be a bracelet, necklace, armband, glasses, anklet, electronic sticker, headband, ornament, or other item that may be worn or integrated with the clothing or body of the client 602. The communications device 606 may communicate utilizing Wi-Fi, Bluetooth, ZigBee, global positioning system (GPS) signals, near field communications, or other existing or developing communications protocols. The communications device 604 may include a microphone, speaker, vibrator, text display, leads, biometric sensor, or other components.

The communications device 604 may also be configured to determine biometric information associated with the client 602. In one embodiment, the communications device 604 may be configured to determine a heart rate, skin response, temperature, breathing rate, blood sugar level, agitation level (e.g. voice intensity, pitch, or frequency), or other vital information associated with the client 602. The communications device 604 may also be able to determine a distance between the client 602 and one or more other clients or the user 616. For example, the communications device 604 may indicate that the client 602 is speaking to two other clients and that the client 602 and a secondary client both have elevated heart rate and are yelling at each other while the user 616 monitors the situation from approximately 20 feet away.

The communications device 604 may transmit client information and a location of the client 602 to one or more centralized systems through a wireless access point, wireless device, intercom system, or other communications points. The communications device 604 may communicate with one or more external devices to determine a location. For example, the communications device 604 may communicate with the sensors 620 indicate a room position of the client 602. In other embodiments, GPS information may be determined by the communications device 604. The GPS information may be utilized to determine the location of the client 602 as well as the communications device 604 if it is lost or otherwise removed. Any number of location generation techniques may be utilized including proximity detection, wireless triangulation, signal strength indicators, or any combination thereof. The scanner 608 and the sensors 620 may be wireless access points, radio frequency identification (RFID) tag readers, wireless beacons, proximity sensors, or other similar devices. In one embodiment, the scanner 608 and the sensor 620 may be integrated with light fixtures, outlets, intercoms, tiles, or other components typically included in a room or facility.

In one embodiment, the communications device 604 may log activities of the client 602 throughout the day and the associated vital information to determine activities that allow the client 602 to relax and activities that may potentially agitate the client 602. The logged activities may be utilized to determine strategics and plans for any number of clients and users.

The location of the client 602 and the user 616 may also be determined utilizing the camera 612. The camera 612 may include picture, video, and audio capturing components. The camera 612 may be wireless or wired for communications with the system as herein described. In one embodiment, the camera 612 may utilize logic or algorithms to perform motion capture including detecting sudden movements, struggles, or other information that may be associated with a negative event. The camera 612 may also capture information associated with positive events for automatic or manual documentation.

Various output devices within the monitoring environment 100 may be configured to communicate auditory, video, visual, or tactile messages to the client 602 or the user 616. In one embodiment, the various communications devices and electronics within the monitoring environment 100 may be controlled through a wired or wireless communications network. As a result, communications and other messaging may be coordinated for maximum effectiveness. In one embodiment, the communications device 604, the display 614, and the speakers 618 may be configured to provide one or more of auditory output (e.g. spoken words, verbal directions, music, a calming mantra, etc.), visual output (e.g. words, pictures, videos), or tactile output (e.g. vibrations with optional speed and frequency).

The strategy may be determined based on an algorithm of the system and may be specific to the client 602. The strategies may be previously entered for the client 602 may be based on data mining for similar situations and clients. For example, a piece of music known calm client 602 may be played through the speakers 618 and the communications device 604 in response to the client 602 becoming agitated. The strategy may be implemented automatically or manually based on selection of the client 602 or a provider, administrator, or other party authorized to implement the strategy for the client 602. For example, the communications device 604 may flash green in response to a positive action and may flash red and vibrate in response to a negative event occurring and then provide positive or negative feedback accompanying suggestions for de-escalation.

Actions performed by the different components of the monitoring environment 600 may be based on the vital information, actions, biometric readings, environmental recordings (e.g. loud noises, repeated movements, etc.) or other indicators that may indicate the behavior of concern is occurring. In one embodiment, the communications device 604 may act as a personal panic device for the client 602. For example, the client 602 may automatically request help by pressing a button on the communications device 604. The communications device 604 may also be enabled for voice communications or may include a walkie-talkie function. In one embodiment, the user 616 may include a similar communications device or may communicate with the client 602 utilizing an application run on both a communications device (not shown) controlled by the user 616 and an application run on the communications device 604 of the client 602.

The display 614 may represent a television, computer monitor, electronic glass, or other display component integrated with or attached to the floors, walls, ceiling, furniture, or other aspects of the monitoring environment 600. In one embodiment, the user 616 may utilize the camera 612 to provide audio and video feedback to the client 602 in any different room or section of the monitoring environment 600. For example, the user 616 may provide instructions for performing a calming ritual known to help the client 602 relax or face a phobia.

In one embodiment, a reinforcement recorder may be linked to the communications device 604. The communications device 604 may be utilized with the reinforcement recorder to provide the client 602 with positive reinforcement on a fixed or variable schedule. The reinforcement may be an auditory, visual, or tactile output that is automatically or manually generated. For example, if the client 602 is viewed as performing a cleaning act without prompting through the camera 612, the user 616 may utilize a cell phone to text a message that is routed to the communications device 604 telling the client 602 that he has done a good job.

The communications device 604 and the other monitoring equipment may also be utilized to monitor the health of the client 602. For example, the client 602 may have a heart condition that may be monitored utilizing a pole, temperature, and position of the user 602. The communications device 604 may include accelerometers that may determine the location and position of the client 602. For example, the accelerometers of the communications device 604 may determine that the client 602 is lying down in a position that is not associated with his room or bed.

The communications device 604 is one example of a communications device that may record data associated with a client. Any number of communications device may be utilized simultaneously. Each communication device may be associated with a client profile or other unique identifier for distinguishing the data. As a result, any number of channels or frequencies may be utilized simultaneously. In one embodiment, the communications device 604 may include multiple transceivers for communicating utilizing a short range signal (when available) and transitioning to long distance communications (e.g., cell signals) when short range signals are unavailable. The communications device may be configured to display a time, date, text, video, audio, or tactile alerts. The communications device 604 may also be configured for simplex, half-duplex, or full duplex communications. The communications device 604 may include a touch screen, dedicated keys (e.g., panic button, voice communications, etc.), soft keys, volume indicator, and so forth. The communications device 604 may represent any number of existing or developing communications devices that interface with the system through communications and software.

The illustrative embodiments provide a number of advantages over the existing art. For example, the embodiments provide an automated AIM process for assessment that drives goals, services, and interventions. Goal management functionality allows goals to be defined, created, tracked and analyzed utilizing data. Goals may be separately stored on any number of micro and macro-levels for reference by other organizations, service providers, and individuals. The illustrative embodiments also provide a prompted data collection, calculation and analysis, and graphing process for information, such as a minimum growth line. Standardized and structured interpretations of data are presented graphically and statistically for review along with a definitive status.

The illustrative embodiments may provide an interface that displays clients assigned to a particular provider. By selecting a picture, icon, text, or avatar associated with the client 602, tracking information would be displayed for easy data entry related to one or more goals. Data may be synched between any number of devices in response to changes saved on a single device. Similarly, alerts and notifications may be propagated through the system to applications and devices based on a user logged in or associated (permanently or temporarily) with the applications and devices. The reinforcement recorder may also be active on a device or application and may allow entry of specified reinforcement information for a client or group of clients to be entered. Medication and other sensitive or critical time-dependent information may be communicated via an audio, video, text, or tactile prompt at a set time interval prior to the event (e.g. prompt a provider to provide a client medication at a set time). All information related to an event, including the client 602, the medication with full dosage and administration instructions, and method for indicating the event is completed may be provided through the interface.

The illustrative embodiments also provide for a number of notifications and alerts. For example, real-time communications may be configured based on preset conditions and parameters (e.g., errors in user application, incomplete data collection or analysis, quality assurance audits, etc.). Stakeholder, team, or transdisciplinary communications are facilitated. For example, stakeholders may see what others have done on a case and automatic alerts are sent out to notify needed stakeholders so that the stakeholders may collaborate and form solutions. As a result, individual responsibility and ownership of issues are encouraged while increasing shared ownership and accountability. All data stored by the illustrative embodiments may be stored and analyzed through a set of standardized reports or customized reports based on user needs. Analysis of data may be utilized for individual client monitoring and may also look for trends in all levels of the hierarchy within the user and among a hierarchy of different users with similar purposes or roles. As a result, the system allows for process modifications at all levels that are associated with the most positive outcomes.

A browser, graphical user interface, or application as herein described may be utilized to provide an example of the embodiments labeled as Reliable Evidence-Based Outcomes Optimization Technologies. The user interface may prompt to one or more users for logging in, creating a password, modifying a password, resetting a password, system administration for providers, searching, suggested searching, alert notification generation and display, customizing a workspace, portal, or dashboard, creating new providers, adding, modifying, and deleting providers, teams, service providers, and clients, client data, profiles, and details, managing permissions, archiving users, creating and managing contacts, updating information, commenting, assigning caseloads, managing caseloads, establishing settings, tracking user activity, updating service information and plans, establishing, recording, tracking, and managing goals and objectives, establishing data collection methods and profiles, performing task analysis, ITT, interval recording, time recording, frequency, percentage recording data, creating episode records, indicating status and significance levels, AIM review, comments (e.g., text, audio, video, etc.), updating goals, goal activity, GMD, quick views, and data collection.

As described in FIG. 6, the illustrative embodiments may be utilized with any number of imaging systems (HD cameras, infrared, multiple wavelengths, etc.), medical devices, communications devices, cameras, or so forth to gather biometric feedback. The biometric feedback may be associated with one or more patients individually or as a group. In one embodiment, biometrics may include pulse rate, facial expressions, sweat analysis, retinal or pupil dilation, body heat output, galvanic skin response, respiration rate, voice stress analysis, or other indicators. In one embodiment, the patients may wear medical devices, such as bracelets, glasses, or headbands. The medical devices may be configured to determine any of the aforementioned biometrics. The biometrics may also be associated with known emotional responses or conditions, such as anger, fear, excitement, agitation, or so forth that may be utilized to intervene or take action. In one embodiment, the biometrics may be configured to generate alerts, such as an indication that a group is becoming agitated or an event may be about to occur, such as a fight or escalated argument.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 depicts an example server 106. The server and other computer systems of FIG. 1 may include a processor unit (possibly including multiple processors, multiple cores, multiple nodes, and/or implementing multi-threading, etc.). The server 106 includes a memory. The memory may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus YY03 (e.g., PCI, ISA, PCI-Express, HyperTransport®, InfiniBand®, NuBus, etc.), a network interface YY05 (e.g., an ATM interface, an Ethernet interface, a Frame Relay interface, SONET interface, wireless interface, etc.), and a storage device(s) or database (e.g., optical storage, magnetic storage, etc.). In one embodiment, the system memory or database 108 associated with the server embodies functionality to implement embodiments described above.

In addition, any one of these functionalities may be partially (or entirely) implemented in hardware and/or on the processing unit of the server 106. For example, the functionality may be implemented with an application specific integrated circuit, in logic implemented in the processing unit, in a co-processor on a peripheral device or card, etc. Further, realizations may include fewer or additional components not illustrated in FIG.>1 (e.g., video cards, audio cards, additional network interfaces, peripheral devices, etc.).

While the embodiments are described with reference to various implementations and exploitations, it will be understood that these embodiments are illustrative and that the scope of the inventive subject matter is not limited to them. In general, techniques for managing goals and outcomes for organizations, groups or individuals as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for tracking progression toward a customized goal, comprising:
receiving input establishing accounts for clients, wherein the clients are individuals receiving treatment or assistance, and wherein the accounts are stored in a server available through one or more networks;

assigning each of the clients to one or more of providers in response to selections from an administrator, wherein the one or more providers communicate with the client via at least a communications device;
establishing customized goals for each of the clients based on treatment or assistance required;
receiving data associated with each of the clients from a biometric device via the communication device;
compiling data associated with each of the clients;
determining whether the customized goals are being met in response to consecutive data points of the compiled data passing one or more thresholds to become significant for one or more of the clients; and
automatically communicating alerts to at least the one or more providers to at least perform a review of the goals for the one or more of the clients in response to consecutive data points of the compiled data varying from the one or more thresholds to become significant for the one or more of the clients.

2. The method of claim 1, wherein the one or more providers further include individuals available to treat or assist the clients.

3. The method of claim 1, further comprising:
intervening in response to communicating the alerts to at least the one or more providers or caregivers associated with the one or more of the clients.

4. The method of claim 3, wherein the one or more providers physically intervene to treat or assist the one or more of the clients.

5. The method of claim 1, wherein the customized goals, data, compiled data, thresholds, and alerts are saved in the server.

6. The method of claim 1, wherein the one or more providers include biometric sensors worn by or proximate to the clients.

7. The method of claim 1, wherein the compiled data indicates the behavior of the clients, and wherein the one or more thresholds include a range.

8. The method of claim 1, wherein the server is accessed through a cloud network, and wherein a client management program is executed by communications devices utilized by the one or more providers to input the data.

9. The method of claim 1, further comprising:
establishing the customized goals in response to input from each of the clients and the one or more providers associated with each of the clients.

10. The method according to claim 1, further comprising:
data mining the compiled data to determine best practices; and
recommending the best practices in response to the best practices being associated with one of the clients.

11. A system for tracking progression toward a customized goal, the system comprising:
a server communicates with communications devices through a transceiver utilizing one or more networks, the server includes a processor that executes a client management program to:
receive input establishing an account for a client, wherein the client is an individual receiving treatment or assistance, and wherein the accounts are stored in a server available through the one or more networks;
assign the client to one or more of providers in response to selections from an administrator, wherein the one or more providers communicate with the client via at least one of the communications devices;
establish customized goals for the client based on treatment or assistance required;
receive data associated with the client from a biometric device via the communications device;
compile the data associated with the client received from the communications devices in communication with the server;
determine whether the customized goals are being met in response to consecutive data points of the compiled data passing one or more thresholds to become significant for the client; and
automatically communicate alerts to at least perform a review of the treatment and assistance in response to consecutive data points of the compiled data varying from the one or more thresholds to become significant for the client; and
a database in communication with the server configured to store the data, customized goals, compiled data, and thresholds associated with the client in the account.

12. The system of claim 11, wherein the one or more providers further include individuals available to treat or assist the client.

13. The system of claim 11, wherein the threshold is a customized range established for the client.

14. The system of claim 11, wherein the one or more providers or caregivers associated with the client physically intervene in response to the alerts.

15. The system of claim 11, wherein the database is a relational database management system performing data mining to analyze the data to automatically associate best practices with the client.

16. A server comprising:
a processor for executing a set of instructions; and
a memory for storing the set of instructions, wherein the set of instructions are executed by the processor to:
receive input establishing accounts for clients, wherein the clients are individuals receiving treatment or assistance, and wherein the accounts are stored in a server available through one or more networks;
assign each of the clients to one or more of providers in response to selections from an administrator, wherein the one or more providers communicate with the client via at least a communications device;
establish customized goals for each of the clients based on treatment or assistance required;
compile data associated with each of the clients received from a biometric device via the communications device;
determine whether the customized goals are being met in response to consecutive data points of the compiled data passing one or more thresholds to become significant for one or more of the clients; and
automatically communicate alerts to at least the one or more providers to at least perform a review of the goals, treatment, and assistance for the one or more of the clients in response to the compiled data varying from the one or more thresholds to become significant for the one or more of the clients.

17. The server of claim 16, wherein the one or more providers include individuals available to treat or assist the clients and the one or more providers include biometric sensors worn by or proximate to the clients.

18. The server of claim 16, wherein the one or more providers physically intervene with the one or more clients in response to the alerts.

19. The server of claim 16, wherein the compiled data indicates the behavior of the clients.

20. The server of claim 16, wherein the set of instructions are further executed to:

recommend best practices in response to historic success with one or more of the clients.

\* \* \* \* \*